H. L. HALL.
Seeder and Cultivator.
No. 109,613.
Patented Nov. 29, 1870.
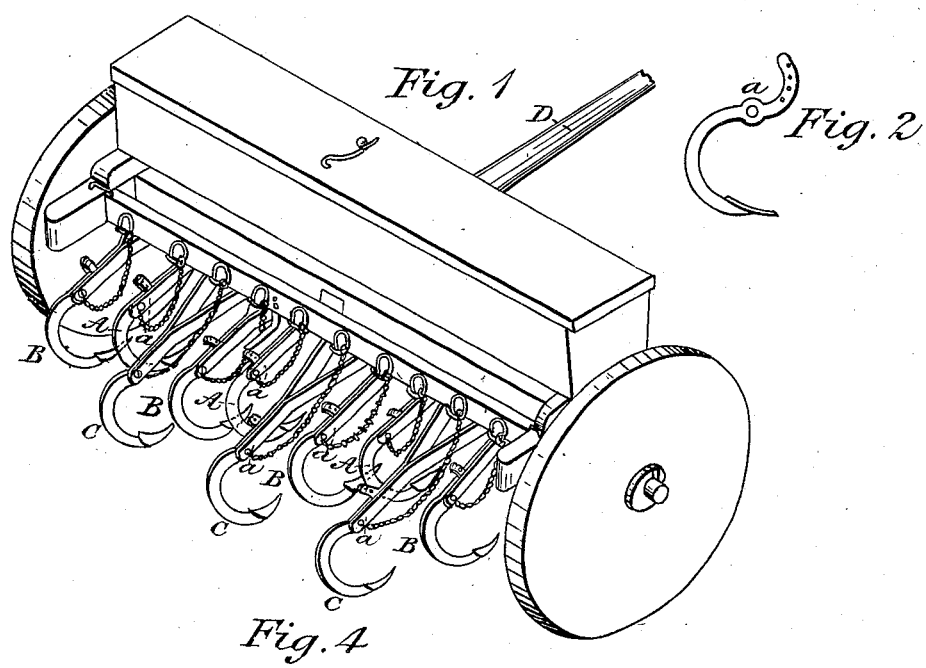
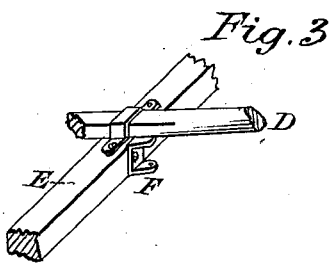
Witnesses:
Inventor:

United States Patent Office.

HENRY L. HALL, OF WOODBRIDGE, IOWA.

Letters Patent No. 109,613, dated November 29, 1870.

IMPROVEMENT IN COMBINED SEED-SOWERS AND CULTIVATORS.

The Schedule referred to in these Letters Patent and making part of the same.

*To all whom it may concern:*

Be it known that I, HENRY L. HALL, of Woodbridge, in the county of Cedar and State of Iowa, have invented a new and improved Combined Seed-Sower and Cultivator; and I do hereby declare that the following is a full, clear, and exact description thereof, reference being had to the accompanying drawings making part of this specification My invention relates to that class of combined seed-sowers and cultivators which first scatters the seed over the ground and then covers them, without forming regular rows or drills in which the seed is deposited as it falls.

It can also be applied to cultivators which are not seed-sowers.

It consists of a new method of arranging the teeth, of an improved form of shank, and of a novel way of attaching whiffletrees to the machine.

In the annexed drawings—

Figure 1 is a perspective view of a seed-sower with my improvements.

Figure 2 is a side view of my improved cultivator-tooth shank.

Figure 3 shows my improved method of attaching whiffletrees to a cultivator or seed-sower.

Figure 4 is a plan, showing the relative positions of the points of the teeth, and the order in which they move on the ground, when arranged in my improved manner.

Figure 5 shows a modification of the same arrangement.

In the use of cultivators constructed in the ordinary way very serious difficulty is experienced on account of stubble, sods, or trash catching between the teeth, choking them, and preventing them from entering the ground in a proper manner.

To obviate this difficulty I arrange the teeth in three or more successive ranks, so that a tooth in any rank will not follow the furrow made by a preceding tooth, but shall make its own furrow between two, or parallel with one already made, the disposition of the teeth in each rank being such as to insure uniformity of distance between all the furrows when the teeth of the last rank shall have performed their office. This arrangement of the teeth allows those of a rank to be far enough apart to permit stubble, clods, &c., to pass between them without choking or otherwise impeding the action of the machine, and is distinctly shown in the drawings, where A A are the thoftee the first, B B of the second, and C C of the third rank.

I prefer placing the teeth in three ranks, but, in some cases, they may be arranged in four or more with advantage.

In order to make the teeth work still more freely, I use a peculiar-shaped shank, shown in fig. 2. It is formed in a double reversed semicircular curve, similar to the letter S, but with the curvatures of unequal length. It is pivoted on the drag-bar at the pivot-hole *a*, the shorter curve being uppermost, and perforated with adjusting-holes for the insertion of the pins commonly used to hold the teeth in working position. A share is attached to the end of the longer curve, which, by its sweep backward from the point, causes the stubble, &c., to slide upward until clear of the ground without clogging the share.

It is found, in the use of cultivators of this class, that, when the single-tree is attached to the pole in the ordinary way, the front end of the pole bears heavily on the necks of the horses, which is objectionable.

To remedy this, I use a clip, attached to the front part of the frame of the machine, beneath the pole, and entirely separate from it, to which clips the single-tree is hung in the ordinary manner.

This may be seen in fig. 3, in which D is the pole, E the front beam of the frame, and F the clip bolted to the frame for holding the single-tree.

By this means I change the line of draft sufficiently downward to remove all unnecessary pressure from the necks of the horses, enabling them to perform their work more freely and with greater ease.

Having thus described my invention,

What I claim, and desire to secure by Letters Patent, is—

The seed-sower and cultivator, having curved adjustable teeth, constructed as described, and arranged in three or more ranks, in the manner set forth and shown.

In testimony that I claim the foregoing as my own, I have hereunto set my hand this 29th day of May, 1869.

H. L. HALL.

Witnesses:
H. C. PIATT,
WM. GILMORE.